Patented June 30, 1931

1,812,560

UNITED STATES PATENT OFFICE

WALTER SCHOELLER, OF BERLIN-WESTEND, GERMANY, ASSIGNOR TO SCHERING-KAHLBAUM A. G., OF BERLIN, GERMANY

ARTIFICIAL MINERAL WATERS AND METHOD OF PRODUCING SAME

No Drawing. Application filed November 16, 1927, Serial No. 233,745, and in Germany November 23, 1926.

My invention refers to substitutes for mineral waters originating from natural springs and to the process for making same. More particularly the invention refers to mineral waters containing iron in catalytically and consequently also physiologically active form.

Recent investigations have shown that in the natural mineral springs the iron is present in a catalytically active form in which it is for instance enabled to decompose peroxide of hydrogen. This active form of the iron is rather little stable and is therefore not present in the bottled mineral waters nor in the solutions prepared with the aid of natural or artificial mineral spring salts. In view of the fact, however, that catalytically active iron will also develop physiological effects, the activity of the iron appears to be one of the factors, which are responsible for the well-known superiority of the fresh spring water as compared to bottled mineral waters and to artificially prepared solutions of the spring salts.

I have now found that it is possible to artificially prepare mineral waters having all the properties of the natural springs and containing more especially active iron by dissolving ferrous-salts, for instance ferrous-sulfate or ferrous chloride, in water together with substances capable of developing carbon dioxide, for instance bicarbonate and bisulfate of soda. I prefer adding bicarbonate in excess, thereby preventing acid reaction and converting the iron into bicarbonate.

I have further found that the presence of free carbon dioxide and the absence of oxygen act towards rendering the active iron more stable. I therefore prefer using in the manufacture of artificial mineral waters containing iron, water which has been freed as far as possible from oxygen by boiling and which is also saturated with carbon dioxide. I thereby succeed in preserving the active form of the iron a longer time than if using ordinary water from the pipe line, although such water is not altogether unfit for use.

Obviously the combination of salts can be modified by corresponding additions of other salts and mineral components in such manner, that solutions are obtained which correspond to well defined natural mineral springs.

I have further found that solutions of this kind containing active iron can be maintained active for any length of time, if they are bottled with carbon dioxide under heavy pressure. This preservation will not be successful if combinations of salts of this kind are merely dissolved in water in a pressure resisting bottle which is then stoppered. I have found that the mere use of water saturated with carbon dioxide does not suffice for preserving the active form of iron for a longer period, only the action of carbon dioxide under high pressure being capable of effecting this. The pressure of carbon dioxide employed is sufficient to highly charge the water with gas but is not sufficient to make the use of the customary glass bottles dangerous.

The mineral waters containing active iron and placed under high pressure, by means of carbon dioxide, involve the further advantage that a materially higher concentration of catalytically active iron can be obtained than if operating under ordinary pressure. I have also found that the concentration of hydrogen ions is higher than at ordinary pressure.

Various changes may be made in the details disclosed in the foregoing specification without departing from the invention or sacrificing the advantages thereof.

I claim:—

1. In the reproduction of natural mineral waters containing iron, the process which comprises supplying the iron content of said reproduced waters by dissolving therein water soluble ferrous salts of inorganic anions which occur in said natural waters, and stabilizing the said iron content by bottling said water under a high pressure of carbon dioxide; the said reproduced waters being saturated with carbon dioxide, free from constituents foreign to said natural waters and free from oxygen.

2. In the reproduction of natural mineral waters containing iron, the process which comprises dissolving in a quantity of water saturated with carbon dioxide, soluble ferrous salts of inorganic anions which occur in said natural waters, also dissolving therein the bicarbonate and bisulfate of soda, the amount of bicarbonate of soda and bisulfate of soda being at least sufficient to produce a concentration of dissolved $CO_2$ equal to an atmosphere, the said reproduced water having substantially the same composition as the said natural water, and being free from constituents foreign thereto and free from oxygen.

In testimony whereof I affix my signature.

WALTER SCHOELLER.